United States Patent [19]

Marsman et al.

[11] Patent Number: 5,342,522
[45] Date of Patent: Aug. 30, 1994

[54] METHOD FOR THE TREATMENT OF SEWAGE

[75] Inventors: Eric H. Marsman, Warnsveld; Garardus J. F. M. Vlekke, Apeldoorn; Leonardus G. C. M. Urlings, Hoevelaken; Berend A. H. Reitsma, Deventer, all of Netherlands

[73] Assignee: Tauw Milieu B.V., Deventer, Netherlands

[21] Appl. No.: 977,200

[22] Filed: Nov. 16, 1992

[30] Foreign Application Priority Data

Nov. 18, 1991 [NL] Netherlands ............ 9101917

[51] Int. Cl.$^5$ .................... C02F 3/30
[52] U.S. Cl. ................ 210/605; 210/610; 210/624; 210/903; 210/906
[58] Field of Search ........ 210/605, 610, 611, 615–617, 210/622–626, 628, 630, 903, 906

[56] References Cited

U.S. PATENT DOCUMENTS

| | | | |
|---|---|---|---|
| 4,826,601 | 5/1989 | Spratt et al. | 210/610 |
| 4,867,883 | 9/1989 | Daigger et al. | 210/630 |
| 5,182,021 | 1/1993 | Spector | 210/605 |
| 5,213,681 | 5/1993 | Kos | 210/605 |
| 5,248,422 | 9/1993 | Neu | 210/605 |
| 5,252,214 | 10/1993 | Lorenz et al. | 210/605 |

FOREIGN PATENT DOCUMENTS

| | | |
|---|---|---|
| 0087127 | 8/1983 | European Pat. Off. . |
| 3408561 | 9/1985 | Fed. Rep. of Germany . |
| 3619229 | 12/1987 | Fed. Rep. of Germany . |
| 3933326 | 4/1991 | Fed. Rep. of Germany . |
| 2558819 | 8/1985 | France . |

OTHER PUBLICATIONS

"Biological Phosphate Removal From Wastewater with Oxygen or Nitrate in Sequencing Batch Reactors", Environmental Technology Letters, vol. 9, No. 8, Aug. 1988, By G. J. F. M. Viekke et al., pp. 791–796.

Primary Examiner—Thomas Wyse
Attorney, Agent, or Firm—Young & Thompson

[57] ABSTRACT

The invention relates to a method for the treatment of (raw) sewage in a package plant consisting of three bioreactors in series. The treatment is being carried out using three types of biomass.

In a first step phosphate is removed by biological means and, at the same time, the chemical and biological oxygen demand is lowered in a highly loaded active sludge system, in a second step a nitrification is carried out, ammonium being converted to nitrate, and in a third step a denitrification is carried out using a carbon source. In the denitrification step acidified surplus sludge from the P-removing step can also be used instead of an external carbon source. The nitrifying and denitrifying bioreactors are both fixed film processes. The thickness of the biofilm on the support material in the nitrifying bioreactor can be influenced by adjusting the aeration system or by adjusting the hydraulic loading. In the denitrifying bioreactor the thickness of the biofilm can be adjusted by raising the shear by means of raising the superficial velocity in the support material. The system according to the invention makes possible effective treatment of raw sewage in a highly loaded system resulting in the far-reaching removal of COD, nitrogen and phosphate.

The process can be operated in an alternative mode, where the nitrifying and denitrifying bioreactors are exchanged; first bioreactor: biological-P-removal and simultaneous reduction of COD, second bioreactor: denitrification and third bioreactor: nitrification. The effluent of the nitrifying bioreactor is recirculated to the denitrifying bioreactor.

The first step is carried out in a plug flow bioreactor with an anaerobic and an aerobic zone. By using an intermediate settling tank between the first and the second step, it is possible to discharge phosphate-rich surplus sludge. The mixing in the nitrifying step is advantageously maintained by aeration under the packages of support material. Mixing in the denitrifying step is accomplished by means of a propellor.

10 Claims, 5 Drawing Sheets

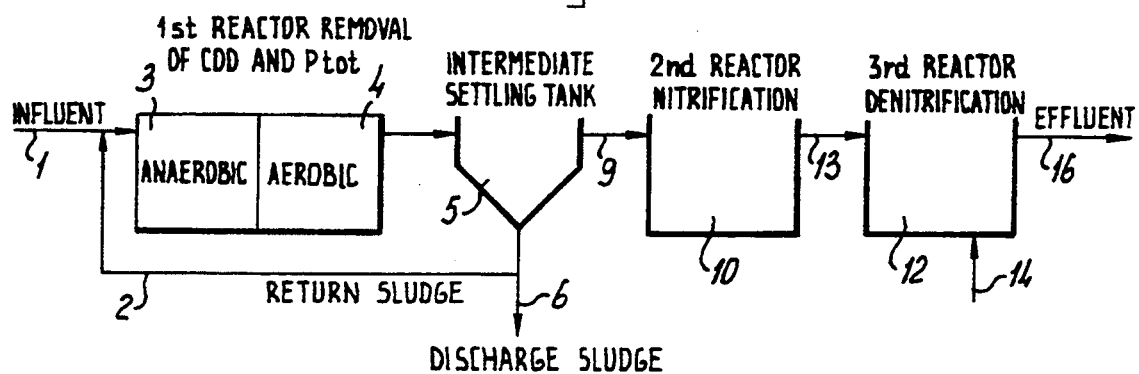
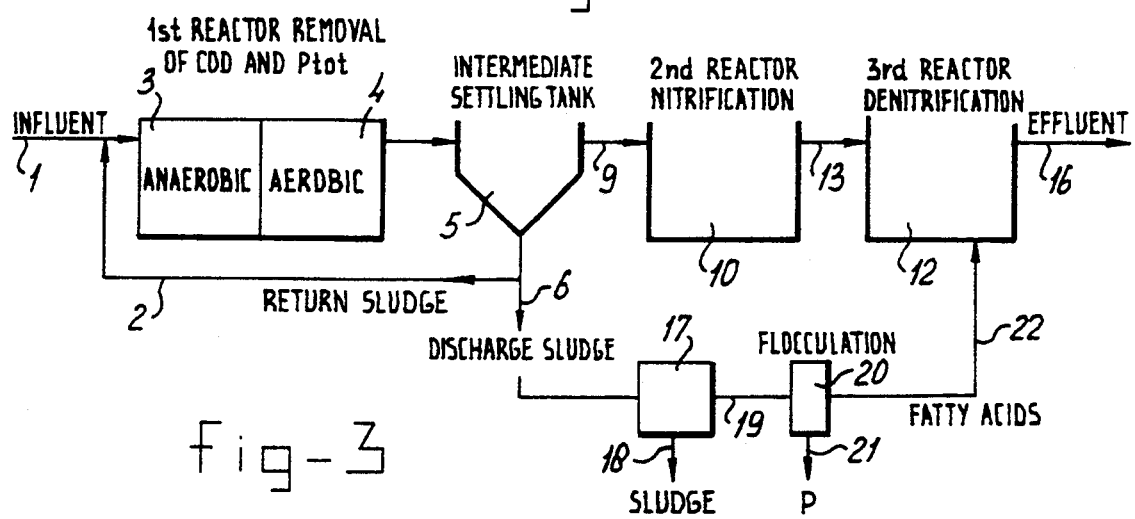
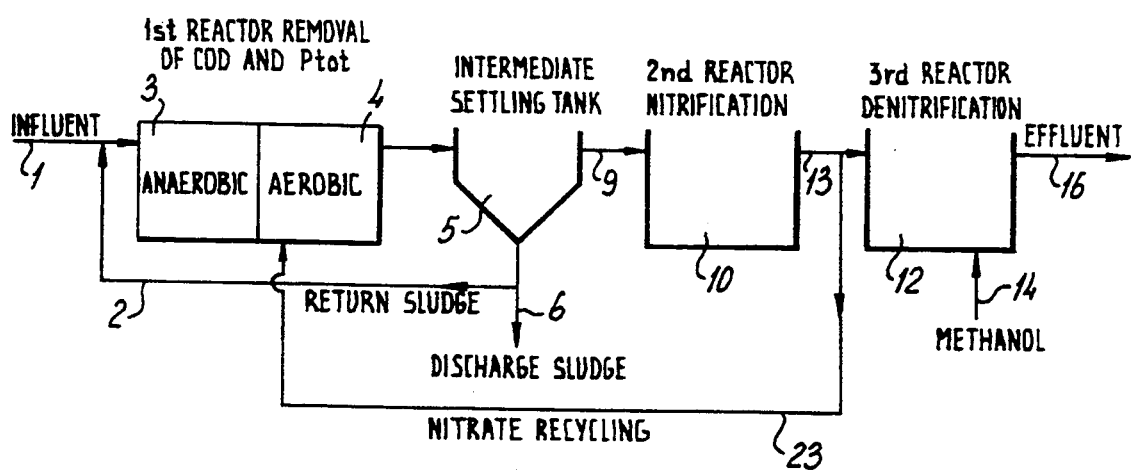

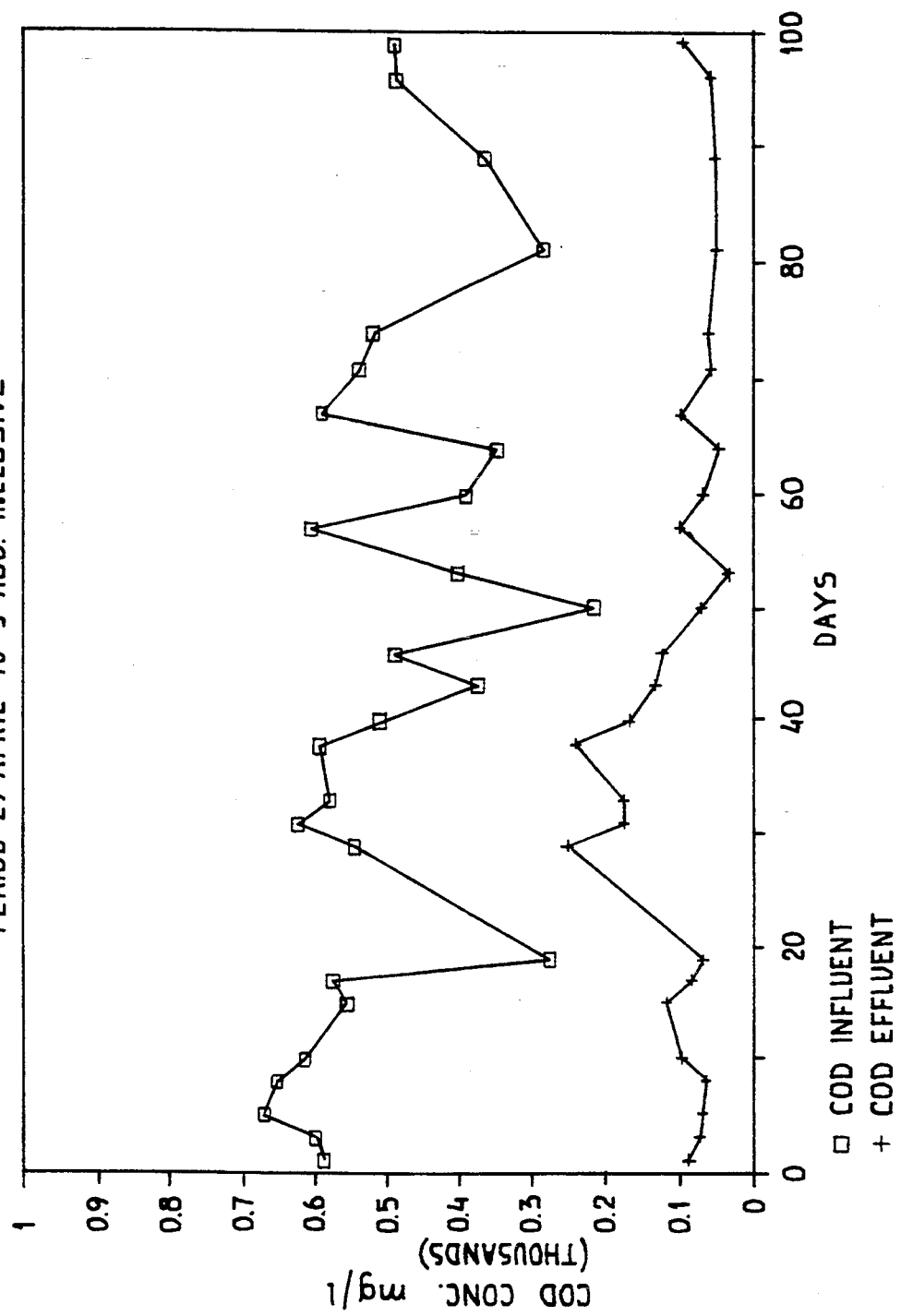

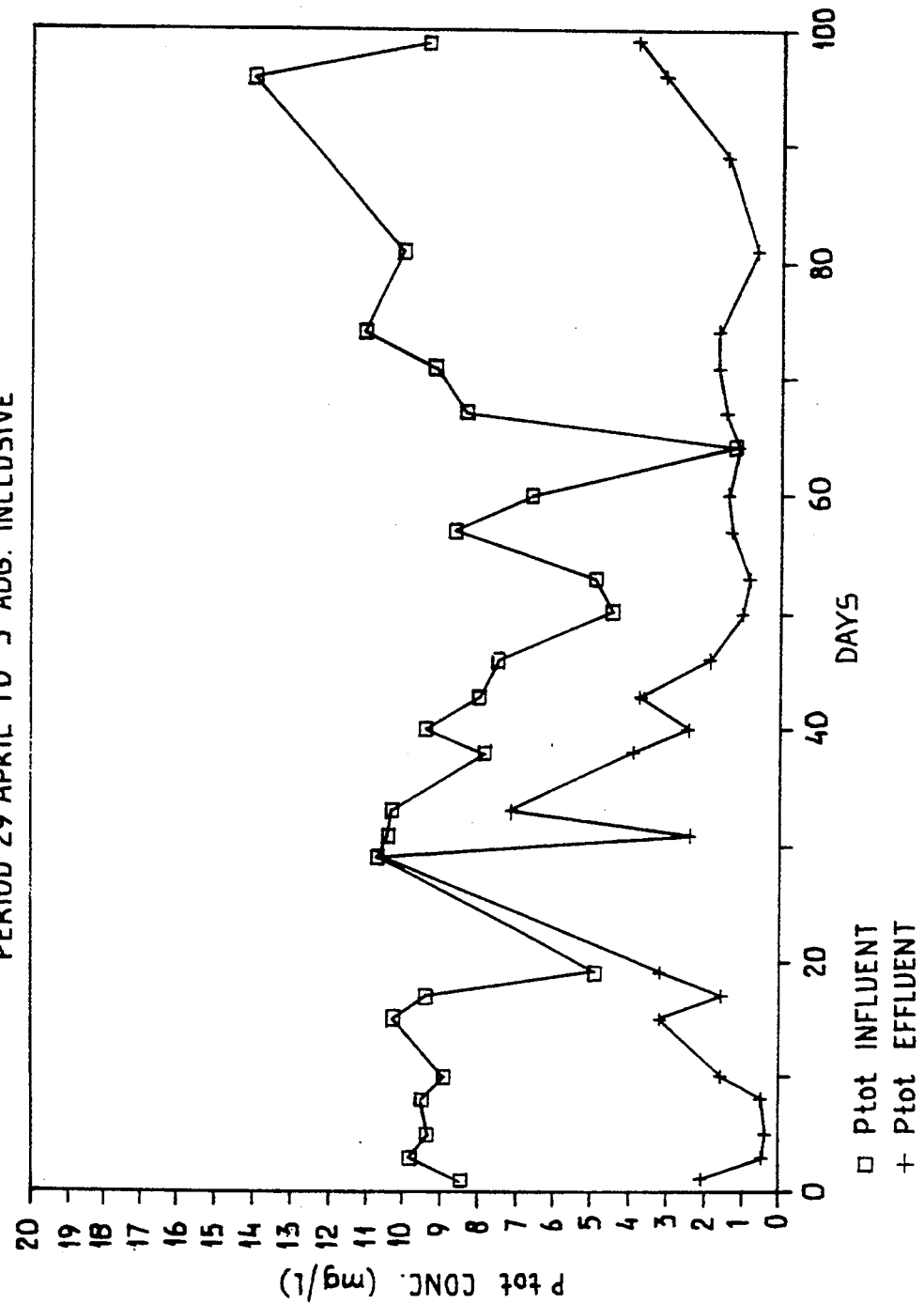

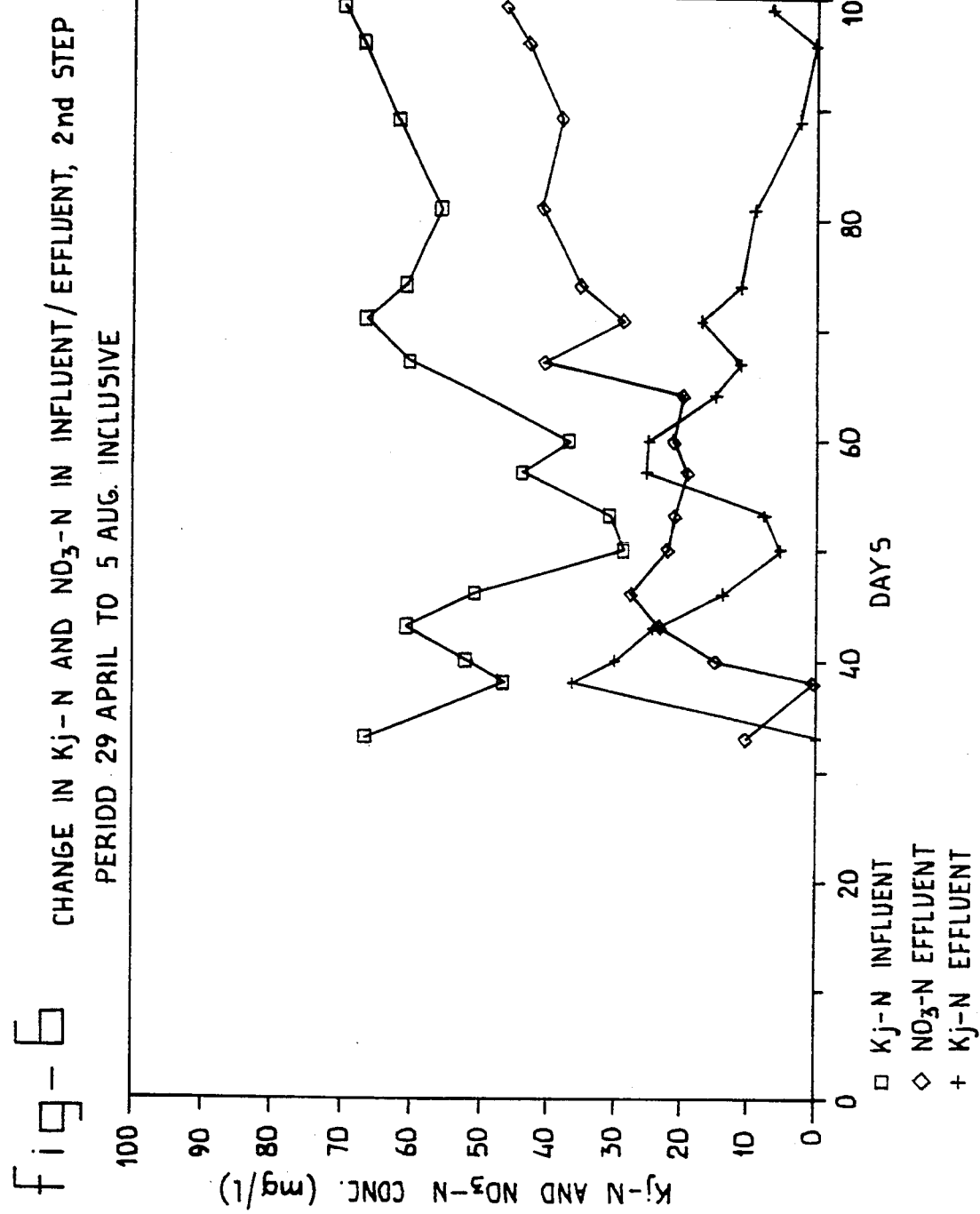

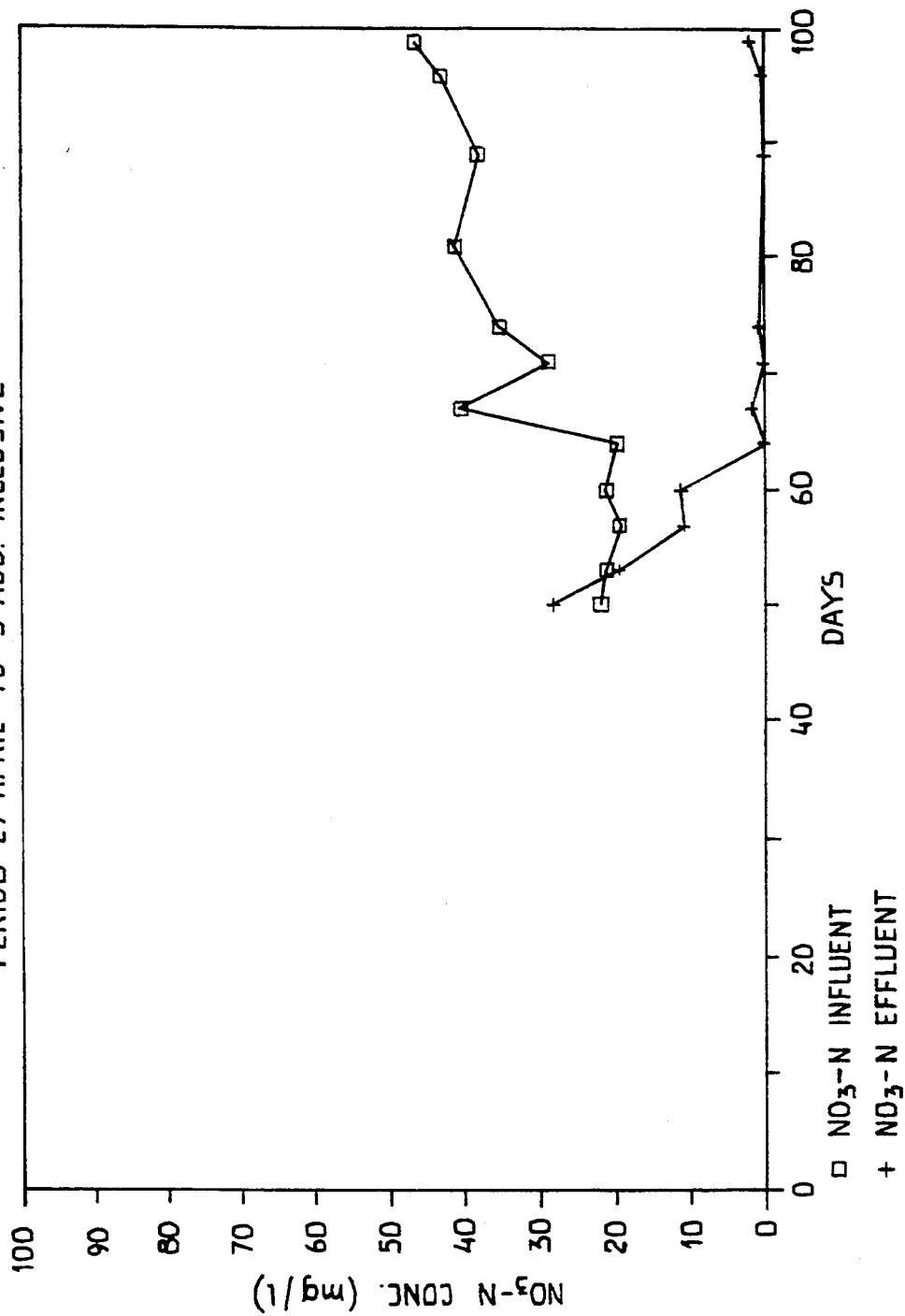

METHOD FOR THE TREATMENT OF SEWAGE

FIELD OF THE INVENTION

The invention relates to a method for the treatment of sewage and to an installation to be used for this method.

BACKGROUND OF THE INVENTION

Installations for the treatment of sewage are generally known. The aim with the conventional installations is to lower the content of organic components and nitrogen in the effluent.

However, with conventional installations of this type the phosphorus content remains virtually unchanged.

A drastic reduction in the discharge of the so-called priority substances, which also include nitrogen and phosphate, is desirable. New sewage treatment plants (STPs) have to be developed for this drastic removal of nitrogen and phosphate.

To date, STPs have been built which partially treat the (raw) sewage with the aid of physical, biological and/or chemical techniques. A sewage treatment plant of this type roughly consists of the following components:
 (1) a coarse filter;
 (2) a sand trap;
 (3) a pre-settling tank;
 (4) a (partially) aerated basin;
 (5) a post-settling tank;
 (6) a sludge thickener; and
 (7) if desired, a sludge, digester and/or sludge dewatering.

In steps 1, 2 and 3, particles are removed from (raw) sewage with the aid of physical techniques. In step 4 biodegradable organic components are consumed by micro-organisms. In addition to heterotrophic bacteria, which convert biodegradable organic material, the mixed liquor of low-loaded systems (e.g. an oxidation ditch or carrousel) also contains autotrophic nitrifying bacteria, which convert ammonia to nitrate.

Sometimes the mixed liquor of low loaded sewage treatment plants contains also denitrifying microorganisms, which convert the nitrate formed into harmless nitrogen gas. The denitrification in STPs is often incomplete, with the consequence that the effluent contains relatively large amounts of nitrate.

The sludge of highly loaded STPs contains no nitrifying microorganisms as a result of which nitrification does not take place. As a consequence the effluent from high loaded STPs contains a large amount of ammonium nitrogen.

Only about 30% of the phosphate in the raw sewage is removed in the existing sewage treatment plants with the consequence that the effluent contains a relatively high concentration of phosphate.

SUMMARY OF THE INVENTION

A method of the type described in the preamble has now been found, which is characterized in that the treatment is carried out with the aid of three types of biomasses, in which method
 a) in a first step phosphate is removed by biological means and, at the same time, the chemical and biological oxygen demand (COD and BOD) are reduced in a highly loaded active sludge system,
 b) in a second step, a nitrification is carried out, ammonium being converted to nitrate, and
 c) in a third step, a denitrification is carried out using a carbon source, in which method the order of the second and the third step is exchangeable.

The use of three specific bioreactors results in biomasses which possess high specific activities. As a consequence each bioreactor can be small and the overall installation can be compact.

In particular, the second and third step are carried out in a biofilm reactor.

With this method it is possible to use high hydraulic loadings and as a result short hydraulic retention times. While using three types of specific biomasses for treating of sewage far-reaching removal of COD, phosphorus and nitrogen from sewage is also found to be possible.

The term "sewage" or "raw sewage" as used in this application comprises not only sewage from (municipal) sewage plants, but also waste water from other sources, e.g. the bio-industry such as waste water from sugar beet processing and (diluted) manure. Any comparable waste stream may be processed according to the present invention.

The new method for treating of sewage can also be operated in an alternative configuration:
 1) Biological phosphorus removal and simultaneous reduction of COD,
 2) denitrification, preferably in a biofilm reactor and
 3) nitrification, preferably in a biofilm reactor.

In this alternative mode of operation effluent of the nitrifying bioreactor has to be recirculated to the denitrifying bioreactor. The advantage of the alternative configuration is a minimalization in the use of an additional carbon source in the denitrifying step, while COD in the effluent from the first step can be used for denitrification.

Sewage which has not been pre-settled can be treated using the method according to the invention. Of course, the ability to dispense with pre-settling is a considerable advantage.

An advantage of the invention is that the new method can be installed simply and effectively in an existing STP.

In the method according to the invention, process conditions which allow the biological removal of phosphate to proceed in conjunction with a lowering of the COD and BOD are created in step a).

A new element in this method is that in step a) a biomass is cultured which is able to remove phosphate by biological means and is also able to oxidize organic components (BOD) at high sludge loading. As a result of the high sludge loading, no nitrification occurs, which is advantageous in respect of the absorption of P by the sludge. This is because nitrate interferes in the biological removal of phosphate. The surplus sludge can also be readily acidified, as a result of which a large amount of fatty acids become available, which fatty acids can be used as the main carbon source in the denitrification step.

Physico-chemical processes also remove components in biological P-removing step a). The effluent from step a) will still contain $N_{Kj}$ in relation to the residual fraction of COD and BOD.

In step b) nitrification is carried out in e.g. a fixed film bioreactor and ammonium is converted to nitrate. There can be interference in the nitrifying bioreactor if heterotrophic bacteria, which use BOD in the influent as growth substrate, start to overgrow the nitrifying bacteria. Preferably, a biomass which grows on a support material is used in this step, e.g. Polacel, reticulated polyurethane or any other support material. The mixing in the reactor is expediently maintained by aeration under the packages of support material. Preferably the biofilm on the support material is not allowed to become thick in order to prevent clogging of the support material and anaerobic conditions in the biofilm. The thickness of the biofilm on the support material can expediently be influenced by means of the aeration regime or by means of the hydraulic loading. The BOD/$N_{Kj}$ ratio in the nitrification is preferably 0.5-1.5.

In the first mode of operation of the invention the denitrifying reactor is supplied with effluent from the nitrifying reactor. In this step a denitrification is carried out using a carbon source. Suitable external carbon sources are, for example, methanol or natural gas. Fatty acids can, for example, be used as an internal carbon source. In this third step, a propeller stirrer or impeller stirrer, which may be placed centrally in the vessel, is preferably used to active proper mixing. In this step Polacel, reticulated polyurethane or any other carrier material can be used as the support material for the biomass. This configuration of the denitrifying reactor and the use of a support material for the biomass in a step like this type is novel. The thickness of the biofilm on the support material is controlled by varying the flow rate of the water mass over the support material by means of the stirrer. By raising the flow rate the shear will be increased.

The invention relates also to a denitrification reactor containing a support material for denitrifying microorganism, said reactor comprising means for keeping in motion the material to be denitrified, in particular a stirrer. By stirring the penetration of liquid through the carrier material is improved. This embodiment is illustrated in the above paragraph and further below.

The alternative configuration of the present invention uses the same bioreactors. However, the order of the second and third step are inverted, which means that the nitrifying and denitrifying bioreactors are exchanged. The alternative configuration results in a different flow scheme. Effluent from the biologically P-removing step flows directly to the denitrifying bioreactor together with recirculated effluent from the nitrifying bioreactor. The advantage of the alternative mode of operation is a reduction in the use of an additional carbon source in the denitrifying step, while residual COD in the effluent of the first step can be used for denitrification. Moreover, the effluent obtained according to the method of the invention will contain oxygen because of aeration in the nitrifying bioreactor.

BRIEF DESCRIPTION OF THE DRAWINGS

FIGS. 1-3 are diagrammatical configurations of sewage treatment plants according to the invention;

FIG. 4 shows the change in the COD in the influent and effluent as a function of time in the first step of a sewage treatment plant according to the invention;

FIG. 5 shows the change in the phosphate in the influent and effluent as a function of time in the first step of a sewage treatment plant according to the invention;

FIG. 6 shows the change in the Kjedahl nitrogen and nitrate content in the influent and the effluent as a function of time in the second step of a sewage treatment plant according to the invention; and FIG. 7 shows the change in nitrate/nitrogen in the influent and effluent as a function of time in the third step of a sewage treatment plant according to the invention.

DETAILED DESCRIPTION OF THE INVENTION

An installation according to the invention is shown diagrammatically in FIG. 1. The configuration of the installation in FIG. 1 is according to the main flow scheme:
1. biological P-removal, simultaneous COD reduction,
2. nitrification, and
3. denitrification.

In this figure means 1 the influent from the first step, 2 indicates the return sludge, 3 is the stirred anaerobic reactor of the first step, 4 is the aerated reactor of the first step and 5 is an intermediate settling tank, from which surplus sludge 6 is discharged and from which, via line 2, return sludge is also fed to the first reactor.

Effluent passes from the intermediate settling tank (5) via line 9 to the second, nitrifying step (10). From (10) the water flows via line 13 to the third, denitrifying step in tank (12), which is provided with an inlet for a carbon source (14) and is also provided with an overflow (16). The effluent of the denitrifying step can eventually be polished to remove suspended solids by means of a microstrain, Dynasand or comparable installations.

The first step is inoculated with biologically dephosphating sludge and the second step is inoculated with nitrifying sludge. The third step is inoculated with denitrifying sludge. The bioreactors must not be too highly loaded in the start-up stage. All these measures will lead to an efficient and reliable system.

In order to prevent nitrification being inhibited, the oxygen concentration in the water phase of the nitrifying reactor must not fall below 1.5 mg $O_2$/l.

The third, denitrifying step is fed with effluent from the second, nitrifying step which contains hardly any COD. Carbon sources are needed for denitrification and, therefore, these must be added in the third step. This can be effected, for example, by the addition of methanol, or also by internally generated fatty acids, e.g. acidified surplus sludge as BOD source for denitrification can also be utilized.

The biomass in the third step will predominantly consist of denitrifying bacteria. Depending on the oxygen content in step 2, the influent of the denitrifying bioreactor still contains oxygen, which first has to be removed before nitrate can be reduced. The water will therefore have to remain in the ideally mixed reactor for a minimum period before all of the nitrate has been converted to nitrogen gas.

The metering of the carbon source must be well matched to the nitrate content of the influent in order to prevent BOD or nitrate passing into the effluent. Values of about 2.5 (g/g) for the methanol/$NO_3$—N ratio are disclosed in the literature: J. P. van der Hoek, P. J. M. Latour en A. Klapwijk, Denitrification with methanol in the presence of high salt concentration and at high pH levels, Applied Microbiology Biotechnology (1987), 27, 199-205.

Frequently it can be advantageous to extend the described installation using components known per se, such as a coarse grid, a sand trap and a pre-settling tank as pretreatment system. If sludge is rinsed out in the third step, the effluent must be subjected to a post-treatment, in which the suspended matter is removed.

In the alternative configuration of the present invention the nitrifying bioreactor is situated after the denitrifying bioreactor. The effluent of the nitrifying bioreactor has to be recirculated to the denitrifying bioreactor. Residual COD in the effluent of the first bioreactor can be used for denitrification of the nitrate. Eventually additional carbon source (14) has to be added.

The first bioreactor is a highly loaded plug flow reactor and is filled with flocculated activated sludge (3 and 4). The activated sludge possesses a high activity, with the consequence that the hydraulic residence time is short. As a result of the high sludge loading nitrifying bacteria are washed our of the system. By applying specific process conditions the growth of phosphate-accumulating bacteria, including Acinetobacter, and of heterotrophic bacteria is stimulated.

The expression "highly loaded" is well-known in the present art. In general, "highly loaded" means more than 0.15, in particular more than 0.3 kg COD per kg dry substance per day. A maximum value may be in the order of 3 kg COD per kg dry substance per day. A preferred range is about 0.3–1 kg COD per kg dry substance per day.

The first section of reactor (3) is not aerated and must be stirred, whilst the second section is aerated. In this section mixing takes place by means of aeration. This bioreactor can be supplied with raw or pre-settled sewage. The advantage of an operation using raw effluent is that a pre-settling tank is saved.

Sewage is mixed together with the return sludge (2) in the non-aerated stage (3). After a minimum residence time, during which the phosphate-accumulating sludge liberates the phosphate, the mixed liquor passes into the aerated zone (4), where the phosphate is taken up. Acinetobacter and other phosphate-accumulating micro-organisms are able to store high amounts of phosphate, up to 10% by weight as polyphosphate inside the cells. This quality of the micro-organisms is used to remove phosphate from sewage.

The mixed liquor is separated into its components in the intermediate settling tank (5). The phosphate loading introduced with the sewage is removed via the surplus sludge (6). In the intermediate settling tank (5) there can be said to be a slight release of phosphate by the settled sludge as a consequence of anaerobic conditions. To prevent release of phosphorus by the P-accumulating micro-organisms in the sedimentation basin the retention time of the sludge in the basin has to be short. However, the residence time in the intermediate settling tank of this invention can be short since the sludge has acquired good settling characteristics as a result of the high loadings.

In addition, the degradation of biodegradable organic components takes place throughout the entire first bioreactor (3+4), as a result of which the COD/BOD content of the sewage is greatly reduced. A fraction of the amount of nitrogen supplied is taken up by the biomass (e.g. about 10% by weight).

The effluent from the highly loaded first step therefore contains little phosphate (for example <1 mg/l) and little COD (<100 mg/l), but it still contains a relatively large amount of nitrogen (>40 mg/l).

The nitrogen which is present in the effluent from the first step is nitrified (10) in the second, nitrifying step. The second step can be a plug flow or mixed system in which nitrifying organisms adhere to a support material. Diverse support materials can be used. In the examples Polacel "type CF" from Polacel B.V., is used; a material which is also used as support material for micro-organisms in rotating biological discs. Polacel has a high specific surface area (up to 250 m$^2$/m$^3$), as a result of which high biomass concentrations are achievable. Other support materials can also be used, e.g. reticulated polyurethane.

The requisite oxygen is introduced with the aid of bubble aeration. By selecting a favourable reactor configuration, natural circulation in the reactor can be created by the aeration.

As a consequence of the reaction of ammonium to nitrate by nitrifying bacteria, protons are formed, as a result of which the pH of the water will fall. If sewage is treated, which has a deficiency of buffering capacity, a pH control probably has to be provided in the second step in order to prevent the aqueous phase becoming too acid (pH >6.5).

The effluent from the nitrifying bioreactor contains a large amount of nitrate, which has to be removed before it can be discharged into the surface water. The conversion of nitrate to nitrogen gas by means of denitrifying organisms takes place in the third, denitrifying step.

The denitrifying bioreactor (12) may be a fixed film process. Corresponding to the nitrification step (10), a system with internal circulation (ideally mixed) can be chosen. However, this will have to be created artificially, for example with the aid of a propeller, e.g. placed in the middle of the reactor.

A close to ideal mixer is obtained by this configuration, which is advantageous for the system. Any components which are toxic to the denitrifying microorganisms are substantially diluted, with the consequence that the risk of deactivation is low.

An additional carbon source must be added to the influent of the denitrifying step (12) in order to prevent the activity of the heterotrophic denitrifying bacteria being carbon-limited.

The use of a carbon source, for example methanol, lower fatty acids or methane, must be matched well to the nitrate content in the influent of the third step. If the amount of carbon source is too high in relation to the amount of nitrate, the BOD content in the effluent increases, which is undesirable. On the other hand, the nitrate content in the effluent increases if the carbon source is added in an amount which is too low in relation to the nitrate content.

The alternative configuration of the present invention where the nitrifying and denitrifying bioreactors are inverted, uses suspended activated sludge for the biological P-removing bioreactor and fixed micro-organisms for the nitrifying and denitrifying bioreactors as well. The effluent of the biological P-removing step still contains residual COD which can be used for denitrification which is an advantage of the alternative configuration. As a result the added amount of external carbon source for the denitrifying micro-organisms can be reduced. Moreover, the addition of the carbon source does not have to be dosed very accurately, because in the aerobic nitrifying bioreactor the COD will be oxidized. At the same time the effluent of the nitrifying bioreactor will contain oxygen due to the aeration, which is an advantage too.

The reactor design described here is able to treat communal sewage rapidly and efficiently. It is pointed out that high removal yields with respect to COD/BOD, nitrogen and phosphate are achievable with this system. Thus, a sewage treatment plant can be obtained which takes up relatively little space.

In FIG. 2 a method in which the emphasis is on the generation of the carbon source for the denitrification is shown diagrammatically. In this figure, the symbols have the same meaning as in FIG. 1. As already described above, a carbon source is needed in order to convert the nitrate into nitrogen gas with the aid of denitrifying bacteria in the third, denitrifying reactor (12). In the two preceding steps, the BOD has been largely removed, with the result that insufficient BOD is present in the influent of the third, denitrifying step for a complete denitrification of the nitrate. The carbon source can be generated within the STP by acidifying surplus sludge from the first bioreactor in an acidification reactor (17). As a result of the anaerobic conditions which prevail in the anaerobic acidification reactor fatty acids are liberated from the surplus sludge.

The residence time in the acidification reactor can be relatively short, in order to prevent methanogenic bacteria further converting fatty acids formed into biogas. This technique can advantageously be combined with the method according to the invention.

The flow chart in which a carbon source is generated by means of acidification of sludge can be represented as described in FIG. 2. In this context account must be taken of the surplus sludge, which contains high concentrations of phosphate, which is liberated under anaerobic conditions. In addition to fatty acids, the acidified sludge contains a relatively high concentration of phosphate and suspended matter. The sludge can be separated from the water phase by means of a settling or filtration step. The water phase, containing fatty acids and phosphate, then passes through a phosphate precipitation step (20), in which the phosphate is precipitated by means of flocculation using a flocculating agent, for example slaked lime or sodium hydroxide solution, and precipitation. The fatty acids which have remained in the water phase can act as carbon source in the third, denitrifying step (12).

The modification shown in FIG. 3 is recycling of nitrate-containing water to the aerated section of the biological P-removing step (4).

It is known (Vlekke et al., Environ. Techn. Lett. 9, pp. 791–796) that phosphate-accumulating bacteria are able to utilized not only oxygen but also nitrate as an electron acceptor. The phosphate-accumulating capacity of bacteria is not affected by the use of nitrate instead of oxygen. By recycling a portion of nitrate-containing effluent from the nitrifying bioreactor into the first step, the aeration in the first reactor can be reduced, as a result of which the operating costs of the system can be reduced. If desired, the nitrate can first be concentrated using, for example, a substrate-specific membrane or an ion-exchanger and then added in the form of a concentrated solution to the first step.

Of course, the recycling of nitrate-containing water must be matched to the requirements.

Another advantage of recycling nitrate-containing effluent to the first step is the reduced supply of nitrate to the third step, with the consequence that the carbon consumption can be saved in the third step. The latter also results in a reduction in the operating costs of the present invention.

The measures of the invention as described above can also be used in the alternative configuration, where the nitrifying bioreactor is situated downstream of the denitrifying bioreactor.

EXAMPLE 1

The treatment was carried out in a test set-up on pilot scale, constructed in accordance with the flow chart in FIG. 1. Hydraulic aspects of the individual steps were studied in this setup. The first step comprises two rectangular PVC tanks (each of 100 liters capacity), which are connected in series, with a settling tank downstream. Each tank is divided by partitions into six compartments, which are connected to one another via round holes in the partitions. A plug flow reactor is obtained by means of this configuration.

Compartments 1 to 6 are stirred by means of paddle stirrers and compartments 7 to 12 are mixed by means of aeration.

The second step comprises a rectangular stainless-steel reactor (capacity 200 liters) and is 60% filled with Polacel support material (250 $m^2/m^3$). The bioreactor is aerated by means of bubble aeration beneath the two packages of support material.

The third step is a circular stainless-steel reactor (200 liters), which is 80% filled with the packing material.

A propellor which is driven by a motor (50 rpm), which ensures flow and mixing, is placed in a vertical column in the center of this reactor (3).

The flow and mixing patterns were studied with the aid of dyes. Pulsed metering into the first reactor showed that the reactor consists of 9.5 mixers, while 10% of the reactor consists of "dead space". The expected number of 12 mixers in series was not achieved and the "dead space" was also relatively large and for this reason the aeration intensity and the stirring frequency were increased. Both modifications yielded the desired result.

A pulse injection of dye (fluorescein) into the second step showed that the mixing pattern of the reactor virtually approached that of an ideal mixer. The number of mixing steps was 1.6 and the "dead space" 5%.

Ideal mixing behaviour was also observed in the third step; the number of mixing steps was 1.6 and the dead space 18%. It can be seen from the results that, after carrying out a few modifications, the flow profiles of the individual steps comply with the expected pattern.

EXAMPLE 2

After the reactor had been inoculated with phosphate-accumulating sludge, the first step of the pilot plant was fed with sewage which had not been pre-settled. By inoculating the reactor with specific sludge, the start-up stage was relatively short (one week). The hydraulic residence time was six hours and the sludge loading was 0.45 kg COD/kg of dry solids/day. In this step COD and the phosphate are the most important components which have to be removed. For this reason only the contents of these components in the influent and effluent for the first step are shown in FIGS. 4 and 5. The values shown are the results for non-filtered samples of influent and effluent.

The influent phosphate concentration varied between 5 and 14 mg P/l and the effluent content was on average lower than 1.0 mg P/l. A few results which fall outside the general pattern can be seen in the figures; these were the result of rainfall, which substantially diluted the sewage, and of mechanical faults when taking samples and in the test set-up.

The effluent total phosphate concentration was adversely affected in a few measurements as a result of washing out of sludge.

The COD content in the effluent was less than 100 mg $O_2$/l and a treatment yield of more than 85% was achieved.

This experiment shows that the first step can be used to remove phosphate and organic components from sewage.

EXAMPLE 3

After inoculating with nitrifying sludge from a low-loaded activated sludge test set-up, the second step was fed with effluent from the first step. The hydraulic residence time was six hours and the average nitrogen sludge loading 1.1 g $N_{Kj}$/$m^2$.day. FIG. 6 shows the change in the Kjedahl nitrogen in the influent and the effluent as a function of time. The samples are non-filtered mixed samples from 2, 3 or 4 days. The change in the nitrate content in the effluent from the second step as a function of time is also shown in FIG. 6.

It can be seen from FIG. 6 that the second step is capable of converting the Kjedahl-nitrogen to nitrate. It can clearly be seen that a start-up period of a few weeks was required.

After a start-up stage, a thin biofilm, which had a high nitrification activity (1 g $NH_4$—N/$m^2$.day), formed on the support material. The nitrite content in the reactor was less than 1 mg $NO_2$—N/l throughout the entire experiment and is not shown in the graph.

The above demonstrated that the test set-up in the configuration used is suitable for use. The mixing in the reactor is good and good nitrification took place.

EXAMPLE 4

The nitrate formed in the second step is converted to mainly elemental nitrogen in the third step, with the aid of denitrifying microorganisms. Methanol was used as external carbon source for the denitrifying microorganisms. The results of an experiment with the denitrification reactor are shown in FIG. 7. For this experiment the third step was inoculated with denitrifying sludge from a denitrifying STP, after which the reactor was fed with effluent from the second step. The hydraulic residence time was six hours.

The nitrate content in the influent was low in the initial phase, with the consequence that the nitrate-nitrogen loading was low; however, after a few weeks, the nitrate content in the influent increased, after which a maximum nitrate-N sludge loading of 1.2 g $NO_3$—N/$m^2$.d was obtained.

The biofilm which formed on the support material had good adhesion characteristics. Although washed out sludge regularly occurred in the effluent, the content of suspended matter was found to be no higher than that in conventional STPs. It is possible that an effluent polishing step will have to be incorporated downstream.

Methanol was a good carbon source for denitrifying organisms; nitrate effluent values of 0–1.5 mg/l were no exception. The pH in the reactor rose as a consequence of the denitrification activity to values of pH 7.5. The rise in pH was substantially caused by an increase in bicarbonate.

This example clearly shows that the designed bioreactor can be used as a denitrification reactor. However, a carbon source has to be added in order to allow the denitrification to proceed.

The experiments show that the invention described here can be used in order to treat communal sewage efficiently and extensively. It is obvious that, although the invention has been described on the basis of the results obtained in the test set-up, this does not signify that the invention cannot be carried out in a different configuration of the installation.

We claim:

1. Method for the treatment of sewage, wherein the treatment is carried out with the aid of three types of biomasses, said method comprising:
    a) biologically removing phosphate in a first step and, at the same time, reducing the chemical and biological oxygen demand in a highly loaded activated sludge system,
    b) converting ammonium to nitrate in a second step by biological nitrification, and
    c) carrying out in a third step, a denitrification using a carbon source, wherein the order of the second and the third step is exchangeable.

2. Method according to claim 1, wherein the first step is carried out in more than one reactor, an anaerobic and an aerobic treatment being used alternately in the reactors.

3. Method according to claim 2, wherein effluent from the second step is recycled to the aerobic treatment of the first step in order to reduce the amount of oxygen introduced into the first step and to reduce denitrification activity in the third step.

4. Method according to claim 1, wherein the third step is fed with acidified sludge from the first step.

5. Method according to claim 1, further comprising using an intermediate settling tank, from which phosphate-rich sludge can be discharged, between the first and the second step.

6. Method according to claim 5, wherein the second step is carried out in a biofilm reactor using biomass on packages of support material, and mixing is maintained in said reactor by aeration under the packages of support material.

7. Method according to claim 6, wherein the thickness of the biofilm on the support material is influenced by the aeration or the hydraulic loading.

8. Method according to claim 5, further comprising using a propeller or impeller for mixing in the third denitrification step.

9. Method according to claim 1, further comprising discharging sludge from the activated sludge system of the first step, and acidifying said discharged sludge in order to generate fatty acids, which can be used as a carbon source in the third step.

10. Method according to claim 9, further comprising separating the acidified discharge sludge into a water phase and a sludge fraction, subjecting the water phase to flocculation/precipitation in order to precipitate dissolved phosphate, before adding the water phase, containing fatty acids dissolved therein, to the third step.

* * * * *